US008732102B2

(12) United States Patent
Rowe et al.

(10) Patent No.: US 8,732,102 B2
(45) Date of Patent: May 20, 2014

(54) SYSTEM AND METHOD FOR USING ATOMIC AGENTS TO IMPLEMENT MODIFICATIONS

(75) Inventors: James Rowe, Herriman, UT (US); Sandeep Vijay Kharkar, Bountiful, UT (US); Kirk A. Baum, American Fork, UT (US); C. Matthew Dawson, Highland, UT (US); David M. Haslam, South Jordan, UT (US)

(73) Assignee: Disney Enterprises, Inc., Burbank, CA (US)

( * ) Notice: Subject to any disclaimer, the term of this patent is extended or adjusted under 35 U.S.C. 154(b) by 494 days.

(21) Appl. No.: 13/030,036

(22) Filed: Feb. 17, 2011

(65) Prior Publication Data
US 2012/0214586 A1 Aug. 23, 2012

(51) Int. Cl.
*G06F 17/00* (2006.01)
*G06N 5/00* (2006.01)

(52) U.S. Cl.
USPC .......................................................... 706/45

(58) Field of Classification Search
USPC ................................................... 706/45, 62
See application file for complete search history.

(56) References Cited

U.S. PATENT DOCUMENTS

| 2005/0026685 A1* | 2/2005 | Ruark et al. | 463/31 |
| 2007/0021200 A1* | 1/2007 | Fox et al. | 463/30 |
| 2009/0091563 A1* | 4/2009 | Viz et al. | 345/419 |

OTHER PUBLICATIONS

GameSpot, "City of Heroes Walkthrough", Jun 18, 2004.*

* cited by examiner

*Primary Examiner* — Jeffrey A Gaffin
*Assistant Examiner* — Ilya Traktovenko
(74) *Attorney, Agent, or Firm* — Patterson & Sheridan LLP

(57) ABSTRACT

Techniques are disclosed for using atomic agents to implement modifications to actors. The atomic agents are self-functioning and may be applied to and removed from an actor in order to modify the behavior and/or appearance of the actor. The default appearance and behavior of the actor is embedded in the program code that defines the actor. One or more atomic agents may be applied to the actor to modify the actor's appearance or behavior without requiring any communication or interaction with the program code that defines the actor. Separate program code defines each atomic agent and the compatibility between the respective atomic agent and other atomic agents.

20 Claims, 5 Drawing Sheets

LIBRARY OF ATOMIC AGENTS
150-A

WINGED ATOMIC AGENT
305
Compatibility match = None
Compatibility = None
Modifier: Geometry is Animated Fairy Wings
Modifier: Fairy Particle Emitter FIRE ATOMIC AGENT
315
Compatibility match = WINGED
Compatibility = Exclusive
Modifier: Geometry is Animated Flames
Modifier: Sparks Particle Emitter STONE ATOMIC AGENT
325
Compatibility match = BOUNCY
Compatibility = Dominant
Modifier: Disables animation BOUNCY ATOMIC AGENT
335
Compatibility match = None
Compatibility = None
Modifier: Up and down motion

Figure 3A

INCREASING TIME (T)

| ACTOR MODIFICATION SEQUENCE 300 |||
|---|---|---|
| INITIATED ACTOR MODIFICATION | ACTOR STATE (T) | ACTOR STATE (T+1) |
| APPLY WINGED 341 | NONE | WINGED |
| APPLY BOUNCY 342 | WINGED | WINGED BOUNCY |
| APPLY STONE 343 | WINGED BOUNCY | WINGED BOUNCY (Disabled) STONE |
| REMOVE STONE 344 | WINGED BOUNCY (Disabled) STONE | WINGED BOUNCY |
| APPLY FIRE 345 | WINGED BOUNCY | BOUNCY FIRE |
| APPLY WINGED 346 | BOUNCY FIRE | BOUNCY FIRE |
| REMOVE FIRE 347 | BOUNCY FIRE | BOUNCY |
| REMOVE BOUNCY 348 | BOUNCY | NONE |
| APPLY STONE 349 | NONE | STONE |
| APPLY BOUNCY 350 | STONE | STONE BOUNCY (Disabled) |
| REMOVE STONE 351 | STONE BOUNCY (Disabled) | BOUNCY |

Figure 3B

SYSTEM AND METHOD FOR USING ATOMIC AGENTS TO IMPLEMENT MODIFICATIONS

BACKGROUND

1. Field of the Invention

The present invention relates to actors and, in particular, to using atomic agents to implement modifications to actors.

2. Description of the Related Art

Computer game systems are popular forms of entertainment that present a virtual world within which a player typically controls an actor, e.g., character, avatar, or entity that interacts with other actors in a simulated environment. The other actors may be computer-controlled or controlled by other players, when the computer game system supports multi-player games, e.g., an online virtual world. The computer-controlled actors are designed by a game developer and the behavior and appearance of the computer-controlled actors, including responses to other computer-controlled actors is embedded in the program code defining the actor. During gameplay, the appearance and behavior of the actor may be modified based on interactions with the player, another computer-controlled actor in the game, or an object in the simulated environment.

When a new actor is added to a game, the program code defining the existing actors needs to be modified in order for the existing actors to interact with the new actor. Similarly, when a new appearance or behavior is added to the game, the program code defining each existing actor that will exhibit the new appearance or behavior needs to be modified.

As the foregoing illustrates, there is a need in the art for an improved technique updating existing actors to exhibit new appearances and behavior.

SUMMARY

One embodiment of the invention provides a computer implemented method for using atomic agents to modify the characteristics, e.g., behavior and/or appearance, of computer-controlled actors. The atomic agents are self-functioning and may be applied to and removed from a computer-controlled actor or a user-controlled actor in order to modify one or more characteristics of the actor. The default appearance and behavior of the actor is embedded in the program code that defines the actor. One or more atomic agents may be applied to the actor to modify the actor's appearance or behavior without requiring any communication or interaction with the program code that defines the actor. Separate program code defines each atomic agent and the compatibility between the respective atomic agent and other atomic agents.

An embodiment of the invention includes a computer-implemented method for modifying a characteristic of an actor. The method may generally include initiating a modification of the characteristic of the actor and determining a compatibility between the atomic agent and each existing atomic agent already attached to the actor based on at least a compatibility match defined by the atomic agent. State data associated with the actor is updated based on the compatibility to indicate that the atomic agent is attached to the actor and the characteristic of the actor is modified according to at least one modifier defined by the atomic agent.

Other embodiments include, without limitation, a computer-readable medium that includes instructions that enable a processing unit to implement one or more aspects of the disclosed methods as well as a system configured to implement one or more aspects of the disclosed methods.

One advantage of the techniques described herein is that new atomic agents may be created and applied to new or existing computer-controlled and user-controlled actors without modifying the program code that defines the new or existing actors. An atomic agent is a single modifier of actor appearance and/or behavior that may be shared amongst one or more actors. The separation between the program code defining actors and the atomic agents is modular and allows for greater scalability and flexibility of computer game systems.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a conceptual diagram of the library of atomic agents shown in FIG. 1, according to one embodiment of the invention.

FIG. 3B is a conceptual diagram of an actor modification sequence applying and removing atomic agents to implement one or more aspects of the present invention.

DETAILED DESCRIPTION OF EXEMPLARY EMBODIMENTS

Figure 1:
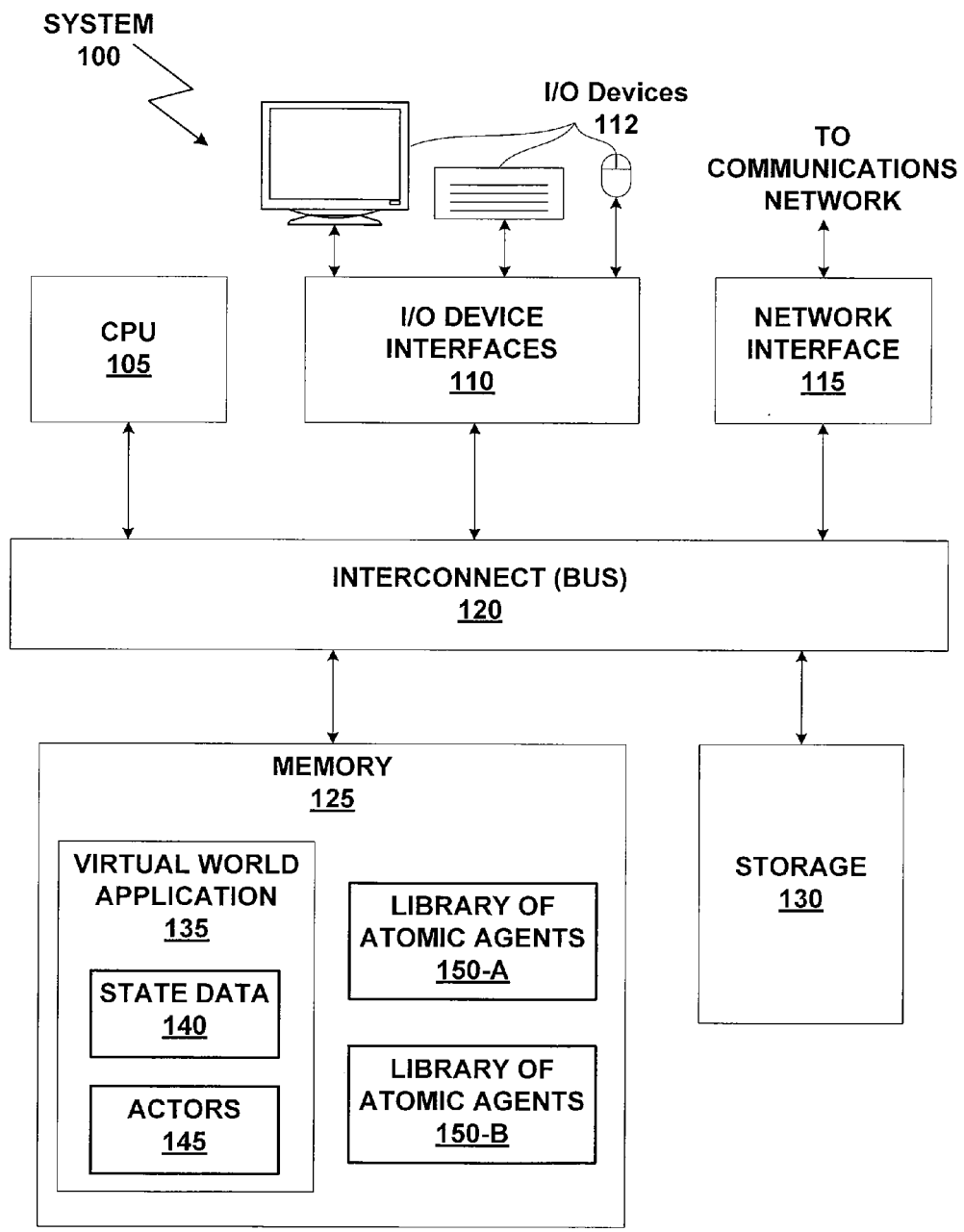
FIG. 1 illustrates a computing system configured according to one embodiment of the invention.

Embodiments of the invention include a system for using atomic agents to modify the behavior and/or appearance of computer-controlled and user-controlled actors. The computer-controlled and user-controlled actors may include characters, avatars, and entities, where an entity may be any element of a virtual environment, such as the terrain, crates, rocks, clouds, and the like. The atomic agents are self-functioning and may be applied to and removed from an existing or new actor. Separate program code defines each atomic agent and the compatibility between the respective atomic agent and other atomic agents. The default appearance and behavior of the computer-controlled actor is embedded in the program code that defines the actor. One or more atomic agents may be applied to the actor to modify the actor's appearance or behavior without requiring any communication or interaction with the program code that defines the actor.

One embodiment of the invention provides a computer-implemented method for using atomic agents to implement modifications to computer-controlled and user-controlled actors. The method may generally include initiating a modification of the characteristic of the actor and determining a compatibility between the atomic agent and each existing atomic agent already attached to the actor based on at least a compatibility match defined by the atomic agent. State data associated with the actor is updated based on the compatibility to indicate that the atomic agent is attached to the actor and the characteristic of the actor is modified according to at least one modifier defined by the atomic agent.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As one skilled in the art will appreciate, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a system 100 configured according to one embodiment of the invention. In one embodiment, the computing system 100 may include existing computer systems, e.g., desktop computers, server computers, laptop computers, tablet computers and the like. The system 100 illustrated in FIG. 1, however, is merely an example of one computing environment. Embodiments of the present invention may be implemented differently, regardless of whether the computer systems are complex multi-user computing systems, such as a cluster of individual computers connected by a high-speed network, single-user workstations or network appliances lacking non-volatile storage.

In one embodiment, system 100 includes a standalone virtual world application 135 that functions independently. In another embodiment, the virtual world application 135 included in the system 100 communicates over the communications network to interact with a virtual world application provided by a server computer system (not shown). The system 100 may be configured as a virtual world client used to create a connection with the server system and to receive and render a virtual world online environment. For example, the virtual world application 135 receives commands representing the actions of a player's actor and tracks the status and movement of each actor within the online environment. The virtual world application 135 in turn sends updates to the virtual world application provided by the server computer system over the communications network.

The components described herein may be implemented in a variety of systems and devices. For example, the system 100 may comprise a console designed for execution of games, such as an arcade machine, a SONY PLAYSTATION 3, or a MICROSOFT XBOX 360. The system 100 may also comprise a general computing device configured for execution of games, such as a laptop, desktop, or personal computer.

Graphics and animations for display by the system 100 can be created using any number of methods and devices. Modeling software, such as MAYA, sold by AUTODESK, is often used, especially when generating graphics and animations representing a three dimensional environment. Using such software, an animator can create objects and motions for the objects that can be used by the virtual world application 135 included in the system 100 to provide data for display on a display device.

As shown, the client system 100 includes, without limitation, a central processing unit (CPU) 105, a network interface 115, an interconnect 120, a memory 125, and storage 130. The client computing system 130 may also include an I/O devices interface 110 connecting I/O devices 112 (e.g., keyboard, display and mouse devices). The CPU 105 retrieves and executes programming instructions stored in the memory 125, e.g., the virtual world application 135, library of atomic agents 150-A, and library of atomic agents 150-B. Similarly, the CPU 105 stores and retrieves application data residing in the memory 125, e.g., state data 140. The interconnect 120 is used to transmit programming instructions and application data between the CPU 105, I/O devices interface 110, storage 130, network interface 115, and memory 125. CPU 105 is included to be representative of a single CPU, multiple CPUs, a single CPU having multiple processing cores, and the like. And the memory 125 is generally included to be representative of a random access memory. Storage 130, such as a hard disk drive or flash memory storage drive (e.g., a solid state device (SSD)), may store non-volatile data.

Illustratively, the memory 125 includes a virtual world application 135, which itself includes the state data 140, and actors 145. When executed, the virtual world application 135 accesses the library of atomic agents 150-A and library of atomic agents 150-B which may also be included within the virtual world application 135. In one embodiment, at least a portion of the actors 145, library of atomic agents 150-A, and library of atomic agents 150-B is stored in the storage 130.

The virtual world application 135 may be a game engine that provides graphics and animations associated with a scene or moment in the game. Using the I/O devices, system 130 may display a virtual world as instructed by the virtual world application 135. The virtual application 135 renders a virtual world having virtual locations and virtual actors, including an actor controlled by the user. The virtual world application 135 may provide any variety of games to a user, including but not limited to action games, puzzle games, and word games. For example, the virtual world application 135 may display a three-dimensional map, representing the virtual world and numerous actors through the map, representing both actors controlled by other users in the online environment and non-player, computer-controlled actors.

When a user inputs a command using the input devices 108, the virtual world application 135 evaluates the command and determines the effect of the command on the execution of the game. Similarly, when an interaction occurs between computer-controlled actors, user controlled actors, and/or objects, the virtual world application 135 evaluates the interaction and determines the effect of the interaction on the execution of the game. These effects may be reflected in the graphics and animations displayed to the user. In particular, modifications to characteristics of a computer-controlled actor or a user-controlled actor are performed according to one or more atomic agents and are displayed to the user.

For example, when an actor is touched by a fairy wand, a winged atomic agent is executed, i.e., applied to the actor. Execution of the winged atomic agent may result in the appearance of fairy wings on the actor, animation of the fairy wings, and execution of a particle emitter to generate fairy dust. The program code that generates the animated fairy wings and fairy dust is included within the fairy wing atomic agent. In contrast, a conventional system does not use atomic agents to modify characteristics of computer-controlled and user-controlled actors. Instead, in a conventional system, changes in the visual appearance of each actor resulting from contact with the fairy wand is encoded in the program code defining each respective actor. Examples of other modifications to the visual appearance of an actor that may be produced when an atomic agent is applied to an actor include particles (sparkles, wisps, embers, and the like) that may be emitted, addition or removal of geometry or meshes (limbs, head, wings, and the like), modification of geometry or meshes, modification of textures (clothing, skin appearance, hair color, and the like), and the emission of light to produce a glow effect. In one embodiment, an atomic agent may also encode audio effects so that various sounds are generated or modified when the atomic agent is applied to an actor.

In addition to modifying a characteristic of an actor, an atomic agent also checks for compatibility with any other atomic agents that are attached to the actor. As various atomic agents attach to and detach from an actor, a portion of the state data 140 associated with the actor is updated. An atomic agent that is attempting to attach to an actor (attaching atomic agent) reads the portion of the state data 140 that is associated with the actor to determine which, if any, other atomic agents are attached to the actor (existing atomic agents). The attaching atomic agent then determines whether it is compatible with the existing atomic agents, based on compatibility information encoded in the program code of the attaching atomic agent and in the program code of the existing atomic agents. Based on the compatibility information the attaching atomic agent may complete the attachment to the actor or may detach, i.e., fail to attach. When an atomic agent successfully attaches to an actor, the portion of the state data 140 associated with the actor is updated to indicate the newly formed attachment. Importantly, the attachment process is performed by the attaching atomic agent without communication or interaction with the program code defining the actor. Therefore, the program code defining the actor is simplified. The atomic agent may also be applied to multiple actors, and may modify the appearance and/or behavior differently, based on the respective state data 140 associated with each computer-controlled and user-controlled actor.

Figure 2A:
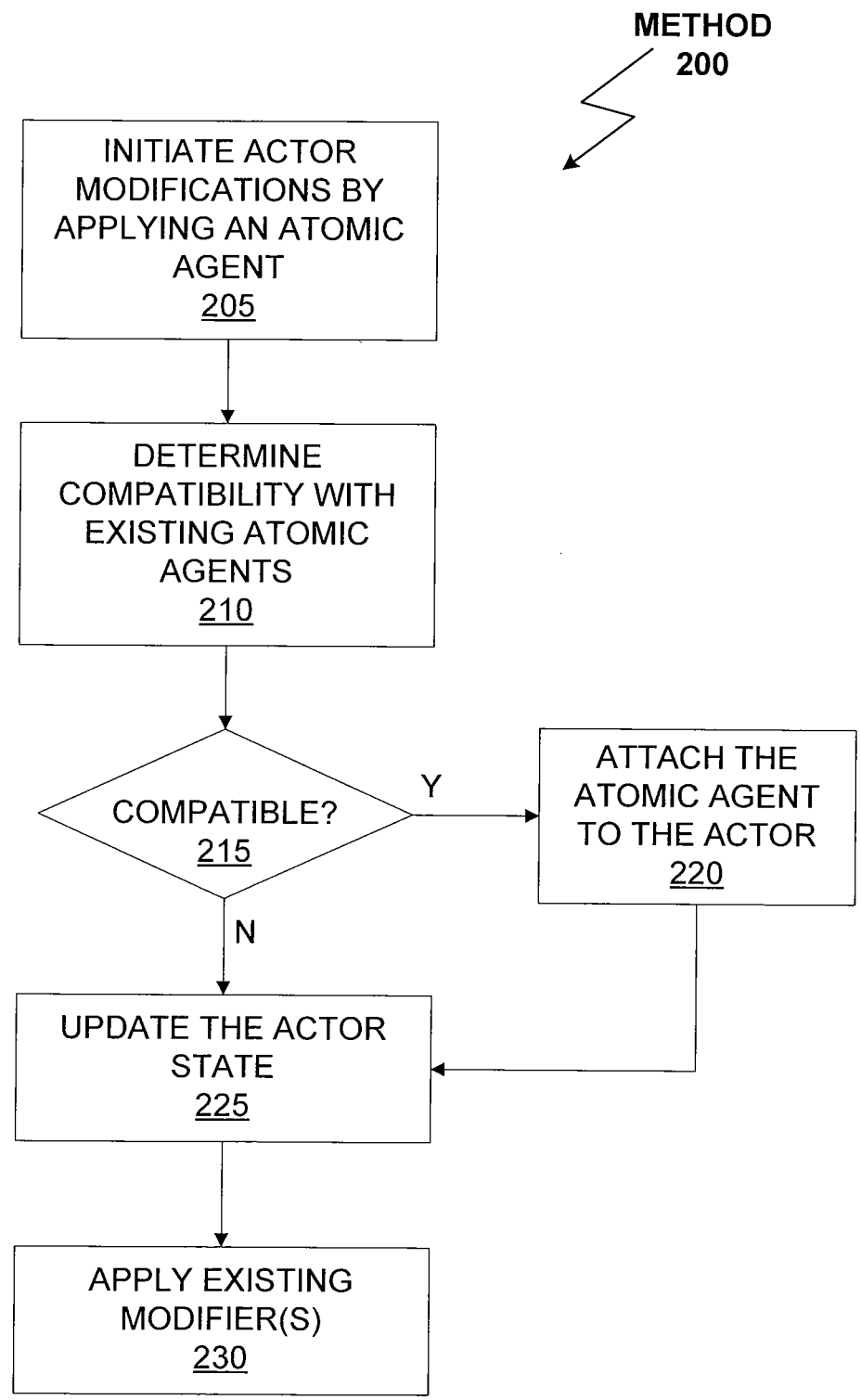
FIG. 2A is a flowchart of method steps describing modifications to an actor performed by applying an atomic agent, according to one embodiment of the invention.

FIG. 2A is a flowchart of method steps describing modifications that are applied to a computer-controlled or user-controlled actor using an atomic agent, according to one embodiment of the invention. Persons skilled in the art would understand that, even though the method 200 is described in conjunction with the systems of FIG. 1, any system configured to perform the method steps, in any order, is within the scope of embodiments of the invention. In one embodiment, the virtual world application 135 may perform the method 200. As shown, the method 200 begins at step 205, where a modification to an actor is initiated by the virtual world application 135 applying an atomic agent to the actor. The atomic agent attempts to attach to the actor in order to modify one or more characteristics of the actor. At step 210 the attaching atomic agent determines the compatibility with any existing atomic agents. At step 215, if the atomic agent is compatible with the existing atomic agents, then at step 220 the attaching atomic agent attaches to the actor and atomic agent proceeds to step 225. Otherwise, when the atomic agent is not compatible with the existing atomic agents, the atomic agent fails to attach to the actor and the virtual world application 135 proceeds directly to step 225.

At step 225 the atomic agent updates the portion of the state data 140 associated with the actor. When the atomic agent attaches to the actor, the portion of the state data 140 is updated to indicate that the attaching atomic agent is attached and is now an existing atomic agent. When an existing atomic agent detaches, the portion of the state data 140 is updated to indicate that the existing atomic agent has detached. In some cases, one or more of the existing atomic agents may be disabled when the attaching atomic agent attaches to the actor. For example, a first atomic agent may have a compatibility set as dominate over a second atomic agent. When the first and the second atomic agents are attached to an actor, the second atomic agent is disabled. A disabled atomic agent remains attached to the actor, but does not modify a characteristic of the actor unless the disabled atomic agent is enabled (or activated). Whether an existing atomic agent is enabled or disabled is also indicated, and updated in the portion of the state data 140 that is associated with the actor. An atomic agent that becomes disabled or detaches as a result of another atomic agent attaching to the actor, updates the portion of the state data 140 to indicate a change from enabled to disabled or from attached to detached. Similarly, an atomic agent that becomes enabled as a result of another atomic agent detaching from the actor, updates the portion of the state data 140 to indicate a change from disabled to enabled.

At step 230 the virtual world application 135 applies modifiers specified by the existing atomic agents to the actor. For example, when a winged atomic agent is applied to the actor, fairy wings appear on the actor, the fairy wings are animated, and a particle emitter is executed to generate fairy dust.

In one embodiment, atomic agents are organized in classes and compatibilities are specified for the different classes instead of or in addition to individual atomic agents. For example the fairy wing atomic agent may be included in an "enchanted" class along with a pixie atomic agent and a glow atomic agent. Atomic agents in the enchanted class may be incompatible with atomic agents in a "futuristic" class. An atomic agent may also be included in multiple classes. For example, the fairy wing atomic agent may also be included in a "fly" class along with other atomic agents that define different types of wings or mechanisms that enable flight. Atomic agents in the fly class may be incompatible with atomic agents in a "heavy" class.

Compatibility information has two components that may be encoded in the program code for each atomic agent, a type and a match. The different compatibility types that may be specified are none, dominant, and exclusive. One or more compatibility matches may be specified for the compatibility types of exclusive and dominant. For example, the compatibility type for the winged atomic agent may be none. The compatibility type for the fire atomic agent may be exclusive and the compatibility match may be fairy wings, i.e., a fire atomic agent and the fairy wings agent may not both be attached to an actor. Only one atomic agent having a compatibility match and a compatibility type of exclusive may be attached to an actor at any time.

Assuming a stone atomic agent has a compatibility type of dominant and has a compatibility match of fairy wings, the stone atomic agent may be attached to an actor when the winged atomic agent is also attached to the actor. However, the stone atomic agent will cause the winged atomic agent to be disabled. The stone atomic agent may be attached to an actor when the fire atomic agent is also attached and the fire atomic agent will remain enabled since the fire atomic agent is not a compatibility match with the stone atomic agent. In sum, only a single dominant atomic agent that has a compatibility match with another atomic agent may be attached and enabled, but other atomic agents that are compatibility matches with the dominant atomic agent and are not the dominant compatibility type may be attached to the actor and disabled.

Figure 2B:
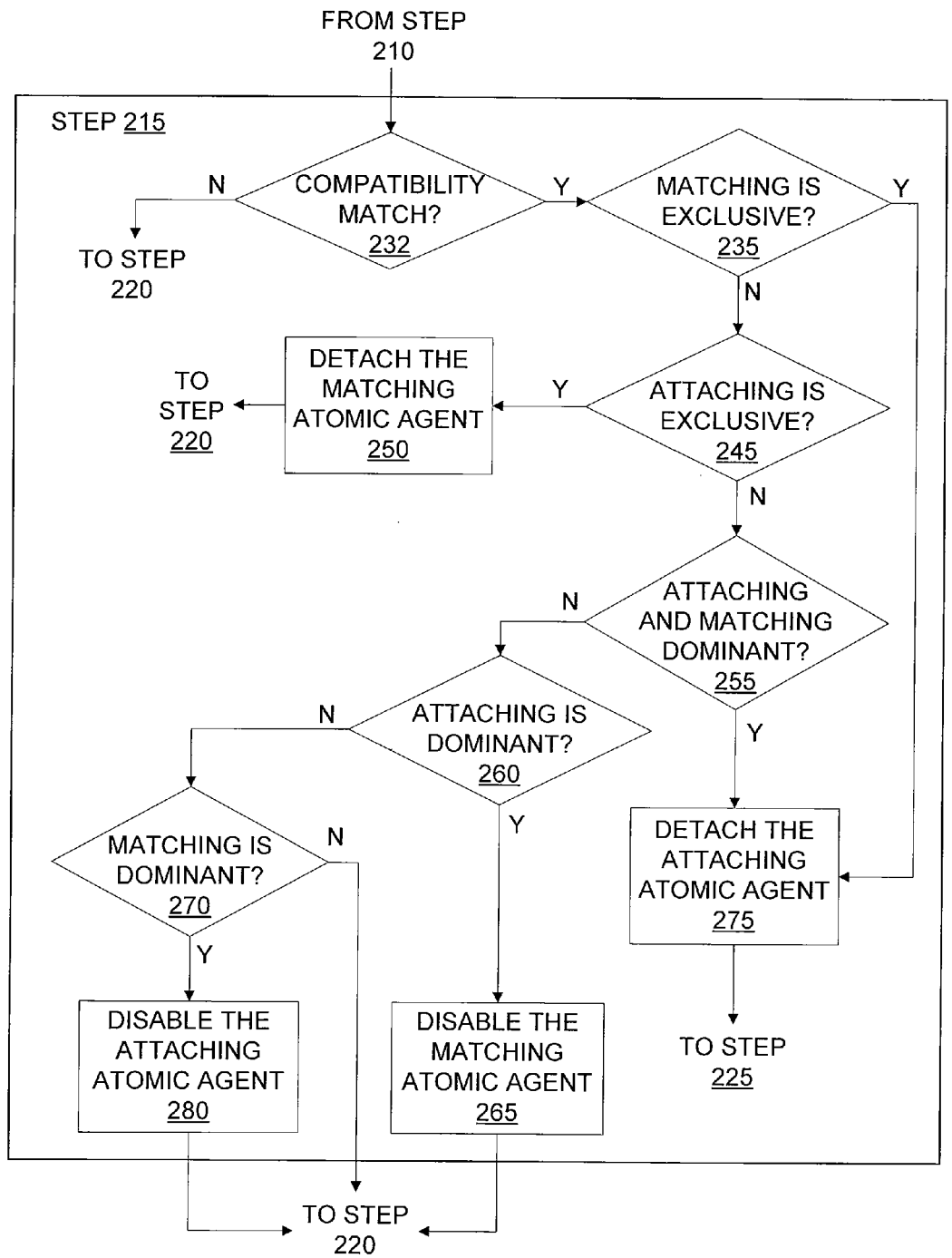
FIG. 2B is a flowchart one of the method steps shown in FIG. 2A, according to one embodiment of the invention.

FIG. 2B is a flowchart of the method step 215 shown in FIG. 2A, according to one embodiment of the invention. At step 232 the attaching atomic agent determines if any there are any matching atomic agents. A matching atomic agent is an existing atomic agent (already attached to the actor) having a compatibility match with the attaching atomic agent based on one or more compatibility matches specified by the attaching atomic agent and any existing atomic agents (already attached to the actor). The compatibility match for an atomic agent may specify individual atomic agent(s) or one or more classes that each include atomic agent(s). If there are no matching atomic agents, then the attaching atomic agent proceeds to step 220 and attaches to the actor. Otherwise, at step 235 the attaching atomic agent determines if any of the matching atomic agents have a compatibility type of exclusive.

If, at step 235 at least one of the matching atomic agents has a compatibility type of exclusive, then at step 275, the attaching atomic agent is detached from the actor before the virtual world application 135 proceeds to step 225. Otherwise, at step 245 the attaching atomic agent determines if the attaching atomic agent has a compatibility type of exclusive. If, at step 245, the attaching atomic agent has a compatibility type of exclusive, then at step 250 the matching atomic agent(s) are detached from the actor before proceeding to step 220. If, at step 245, the attaching atomic agent does not have a compatibility type of exclusive, then at step 255 the attaching atomic agent determines if the attaching atomic agent and at least one of the matching atomic agents have a compatibility type of dominant.

If, at step 255 the attaching atomic agent and at least one of the matching atomic agents have a compatibility type of dominant, then at step 275 the attaching atomic agent is detached from the actor before proceeding to step 225. If, at step 255 the attaching atomic agent and at least one of the matching atomic agents do not have a compatibility type of dominant, then at step 260 the attaching atomic agent determines if the attaching atomic agent itself has a compatibility type of dominant. If, the attaching atomic agent does have a compatibility type of dominant, then at step 265 the matching atomic agent(s) are disabled before proceeding to step 220. Otherwise, the attaching atomic agent does not have a compatibility type of dominant, and at step 270 the attaching atomic agent determines if at least one of the matching atomic agents has a compatibility type of dominant. If, at least one matching atomic agent has a compatibility type of dominant, then at step 280 the attaching atomic agent is disabled before proceeding to step 220. Otherwise, none of the attaching atomic agent and the matching atomic agent(s) have a compatibility type of dominant and the attaching atomic agent proceeds to step 220.

FIG. 3A is a conceptual diagram of the library of atomic agents 150-A shown in FIG. 1, according to one embodiment of the invention. The library of atomic agents 150-A and 150-B may contain different atomic agents. The library of atomic agents 150-A includes a winged atomic agent 305, a fire atomic agent 315, a stone atomic agent 325, and a bouncy atomic agent 335. The program code defining the winged atomic agent 305 specifies no compatibility match and a compatibility type of none. The program code defining the winged atomic agent 305 also specifies modifiers of geometry for animated fairy wings and a fairy particle emitter. The program code defining the fire atomic agent 315 specifies the winged atomic agent 305 as a compatibility match and a compatibility type of exclusive. The program code defining the fire atomic agent 315 also specifies modifiers of geometry for animated flames and a sparks particle emitter. Because the fire atomic agent 315 specifies a compatibility type of exclusive and the winged atomic agent 305 as a compatibility match, the winged atomic agent 305 cannot attach or remain attached to an actor when the fire atomic agent 315 is attached or attempts to attach to the actor.

The program code defining the stone atomic agent 325 specifies the bouncy atomic agent 335 as a compatibility match and a compatibility type of dominant. The program code defining the stone atomic agent 325 also specifies a modifier that animation is disabled when the stone atomic agent 325 is attached to an actor. The program code defining the bouncy atomic agent 335 specifies no compatibility match and no compatibility type. The program code defining the bouncy atomic agent 335 also specifies a modifier of up and down motion so that the actor moves up and down when the bouncy atomic agent 335 is attached to an actor and is enabled. Because the stone atomic agent 325 specifies a compatibility type of dominant and the bouncy atomic agent 335 as a compatibility match, the bouncy atomic agent 335 is disabled when the stone atomic agent 325 is attached to the actor.

FIG. 3B is a conceptual diagram of an actor modification sequence 300 that applies and removes atomic agents to implement one or more aspects of the present invention. The first column describes the initiated actor modification that occurs at a time, T. The second column describes a portion of the state data 140 associated with the actor at time T, before the initiated actor modification. The third column describes the portion of the state data 140 associated with the actor at time T+1, after the initiated actor modification.

When the winged atomic agent is applied to the actor at 341 the actor state (T) is none, indicating that there are no atomic agents attached to the actor. Therefore, the winged atomic agent attaches to the actor and the actor state (T) is updated by the winged atomic agent to indicate that the winged atomic agent is attached, as shown by the actor state (T+1). When the bouncy atomic agent is applied to the actor at 342 the actor state (T) is winged. The winged and bouncy atomic agents have no compatibility match, so the bouncy atomic agent attaches to the actor and the actor state (T) is updated by the bouncy atomic agent to indicate that the bouncy and winged atomic agents are attached, as shown by the actor state (T+1). When the stone atomic agent is applied to the actor at 343 the actor state (T) is winged and bouncy. The stone atomic agent is a compatibility match with the bouncy atomic agent and the stone atomic agent is dominate, so the stone agent attaches to the actor and the bouncy atomic agent is disabled. The actor state (T) is updated by the stone atomic agent to indicate that the stone, bouncy, and winged atomic agents are attached and that the bouncy atomic agent is disabled, as shown by the actor state (T+1).

When the stone atomic agent is removed from the actor at 344 the actor state (T) is stone, winged, and bouncy (disabled). The actor state (T) is updated by the stone atomic agent to indicate that the bouncy and winged atomic agents are attached and that the bouncy atomic agent is enabled, as shown by the actor state (T+1). When the fire atomic agent is applied to the actor at 345 the actor state (T) is winged and bouncy. The fire atomic agent is a compatibility match with the winged atomic agent and the fire atomic agent is exclusive, so the fire agent attaches to the actor and the winged atomic agent is detached. The actor state (T) is updated by the fire atomic agent to indicate that the fire and bouncy, atomic agents are attached, as shown by the actor state (T+1). When the winged atomic agent is applied to the actor at 346 the actor state (T) is fire and bouncy. The winged atomic agent is a compatibility match with the fire atomic agent. Because the fire atomic agent is exclusive, the winged agent is unable to attach to the actor, i.e., the winged atomic agent is detached. The actor state (T) is unchanged, as shown by the actor state (T+1).

When the fire atomic agent is removed from the actor at 347 the actor state (T) is fire and bouncy. The actor state (T) is updated by the fire atomic agent to indicate that the bouncy atomic agent is attached, as shown by the actor state (T+1). When the bouncy atomic agent is removed from the actor at 348 the actor state (T) is bouncy. The actor state (T) is updated by the bouncy atomic agent to indicate that no atomic agents are attached, as shown by the actor state (T+1).

When the stone atomic agent is applied to the actor at 349 the actor state (T) is none, so, the stone atomic agent attaches to the actor and the actor state (T) is updated by the stone atomic agent to indicate that the stone atomic agent is attached, as shown by the actor state (T+1). When the bouncy atomic agent is applied to the actor at 350 the actor state (T) is stone. The bouncy atomic agent is a compatibility match with the stone atomic agent and the stone atomic agent is dominate, so the bouncy agent attaches to the actor and the bouncy atomic agent is disabled. The actor state (T) is updated by the bouncy atomic agent to indicate that the stone and bouncy atomic agents are attached and that the bouncy atomic agent is disabled, as shown by the actor state (T+1). When the stone atomic agent is removed from the actor at 351 the actor state (T) is stone and bouncy (disabled). The actor state (T) is updated by the stone atomic agent to indicate that the bouncy atomic agents is attached and that the bouncy atomic agent is enabled, as shown by the actor state (T+1).

In addition to modifying characteristics of an actor, such as the movements or visual appearance of the actor, an atomic agent may also modify a behavioral characteristic of an actor. For example, the fire atomic agent may cause an actor to move towards sources of water in the virtual environment. A boredom atomic agent may modify an actor's behavior to seek out or move towards points of interest in the virtual environment. Atomic agents may be used to modify an actor's speed, cause an actor to attack nearby or approaching actors, cause an actor to target or hunt enemy actors with the lowest health.

Advantageously, embodiments of the invention described above may be used to separate the definition of a computer-controlled or user-controlled actor from the definition of various characteristics, e.g., behaviors, movements, and appearances, encoded as atomic agents and that may be common to multiple actors. The atomic agents determine compatibility with any other atomic agents that are attached to an actor and, based on the compatibility, the atomic agent may or may not attach to the actor to modify a characteristic of the actor. The atomic agents may be defined without modifying program code defining the actors or other atomic agents. Additionally, a newly defined atomic agent may be applied to an existing computer-controlled or user-controlled actor.

Those skilled in the art will recognize that described systems, devices, components, methods, or algorithms may be implemented using a variety of configurations or steps. No single example described above constitutes a limiting configuration or number of steps. For example, configurations of the system 100 exist in which the described examples of components therein may be implemented as electronic hardware, computer software, or a combination of both. Illustrative examples have been described above in general terms of functionality. More or less components or steps may be implemented without deviating from the scope of this disclosure. Those skilled in the art will realize varying ways for implementing the described functionality, but such implementation should not be interpreted as a departure from the scope of this disclosure.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for modifying a characteristic of an actor with an atomic agent, the method comprising:
    initiating a modification of the characteristic of the actor presented to users of an interactive virtual environment, wherein a first set of program code defines the actor and a second set of program code defines the atomic agent;
    determining a compatibility between the atomic agent and each existing atomic agent already attached to the actor based on at least a compatibility match defined by the atomic agent;
    updating state data associated with the actor based on the compatibility to indicate that the atomic agent is attached to the actor; and
    modifying the characteristic of the actor according to at least one modifier defined by the atomic agent, wherein the second set of program code modifies the characteristic of the actor independently from and without interaction with the first set of program code.

2. The method of claim 1, further comprising determining the compatibility between the atomic agent and each existing atomic agent already attached to the actor based on a compatibility type defined by the atomic agent.

3. The method of claim 2, wherein the atomic agent specifies a compatibility type of dominant or exclusive.

4. The method of claim 1, further comprising, prior to determining the compatibility, reading the state data associated with the actor to identify each existing atomic agent already attached to the actor.

5. The method of claim 1, wherein the atomic agent identifies a different atomic agent as the compatibility match.

6. The method of claim 1, wherein the atomic agent identifies a class including at least one other atomic agent as the compatibility match.

7. The method of claim 1, wherein the atomic agent is disabled when a first existing atomic agent that is attached to the actor is a compatibility match with the atomic agent and has a compatibility type of dominant.

8. The method of claim 1, wherein a first existing atomic agent that is attached to the actor is disabled when the first existing atomic agent is a compatibility match with the atomic agent and the atomic agent has a compatibility type of dominant.

9. The method of claim 1, wherein a first existing atomic agent is detached from the actor when the first existing atomic agent is a compatibility match with the atomic agent and the atomic agent has a compatibility type of exclusive.

10. The method of claim 1, further comprising detaching the atomic agent from the actor when the atomic agent is a compatibility match with a first existing atomic agent that is attached to the actor and the first existing atomic agent has a compatibility type of exclusive.

11. The method of claim 1, wherein a visual appearance of the actor comprises the characteristic of the actor.

12. The method of claim 1, wherein a behavior of the actor comprises the characteristic of the actor.

13. The method of claim 1, wherein a motion of the actor comprises the characteristic of the actor.

14. The method of claim 1, further comprising determining the compatibility between the atomic agent and each existing atomic agent already attached to the actor based on a compatibility match defined by each existing atomic agent.

15. The method of claim 1, further comprising determining the compatibility between the atomic agent and each existing atomic agent already attached to the actor based on a compatibility type defined by each existing atomic agent.

16. A system comprising:
    a processor; and
    a memory, wherein the memory includes an atomic agent configured to modify a characteristic of an actor by performing an operation, the operation comprising:
        initiating a modification of the characteristic of the actor presented to users of an interactive virtual environment, wherein a first set of program code defines the actor and a second set of program code defines the atomic agent,
        determining a compatibility between the atomic agent and each existing atomic agent already attached to the actor based on at least a compatibility match defined by the atomic agent,
        updating state data associated with the actor based on the compatibility to indicate that the atomic agent is attached to the actor, and
        modifying the characteristic of the actor according to at least one modifier defined by the atomic agent, wherein the second set of program code modifies the characteristic of the actor independently from and without interaction with the first set of program code.

17. A non-transitory computer-readable storage medium storing instructions that, when executed by a processor, cause a computer system to modify a characteristic of an actor, by performing the steps of:
    initiating a modification of the characteristic of the actor presented to users of an interactive virtual environment, wherein a first set of program code defines the actor and a second set of program code defines the atomic agent
    determining a compatibility between the atomic agent and each existing atomic agent already attached to the actor based on at least a compatibility match defined by the atomic agent;
    updating state data associated with the actor based on the compatibility to indicate that the atomic agent is attached to the actor; and modifying the characteristic of the actor according to at least one modifier defined by the atomic agent, wherein the second set of program code modifies the characteristic of the actor independently from and without interaction with the first set of program code.

18. The computer-readable storage medium of claim 17, further comprising determining the compatibility between the atomic agent and each existing atomic agent already attached to the actor based on a compatibility type defined by the atomic agent.

19. The computer-readable storage medium of claim 17, wherein a visual appearance of the actor comprises the characteristic of the actor.

20. The computer-readable storage medium of claim 17, wherein a behavior of the actor comprises the characteristic of the actor.

* * * * *